No. 755,994. PATENTED MAR. 29, 1904.
H. BROOME.
PIPE COUPLING.
APPLICATION FILED JULY 6, 1903.
NO MODEL. 2 SHEETS—SHEET 1.

Witnesses
Clifton P. Grant
Chas. J. Welch

Inventor
Henry Broome
By
Staley & Bowman
Attorneys

No. 755,994. PATENTED MAR. 29, 1904.
H. BROOME.
PIPE COUPLING.
APPLICATION FILED JULY 6, 1903.
NO MODEL. 2 SHEETS—SHEET 2.
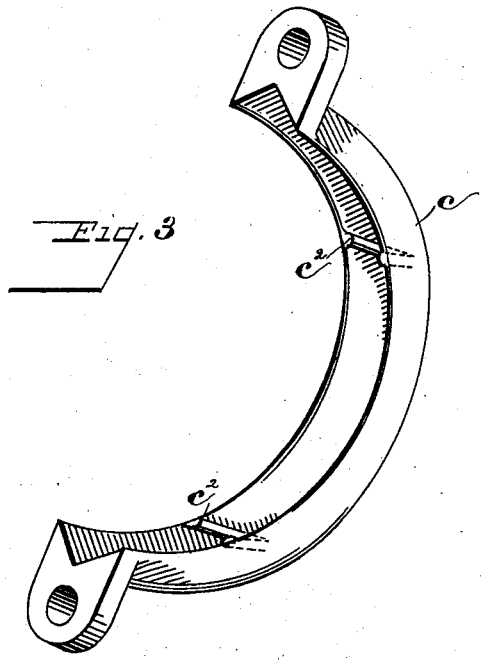

No. 755,994. Patented March 29, 1904.

UNITED STATES PATENT OFFICE.

HENRY BROOME, OF SPRINGFIELD, OHIO, ASSIGNOR OF SEVEN-TWELFTHS TO HENRY C. PAULY AND JAMES D. BOYD, OF SPRINGFIELD, OHIO.

PIPE-COUPLING.

SPECIFICATION forming part of Letters Patent No. 755,994, dated March 29, 1904.

Application filed July 6, 1903. Serial No. 164,436. (No model.)

*To all whom it may concern:*

Be it known that I, HENRY BROOME, a citizen of the United States, residing at Springfield, in the county of Clark and State of Ohio, have invented certain new and useful Improvements in Pipe-Couplings, of which the following is a specification.

This invention relates to pipe-couplings, and has for its object to provide a simple, inexpensive, and efficient means for connecting the meeting ends of plain pipes or pipe-sections, the joint being tight so as to prevent leakage, capable of being readily tightened up and being readily assembled and taken apart when it is desired to connect or disconnect the pipe-sections.

To these ends my invention consists in certain novel features, which I will now proceed to describe and will then particularly point out in the claim.

Figure 1:
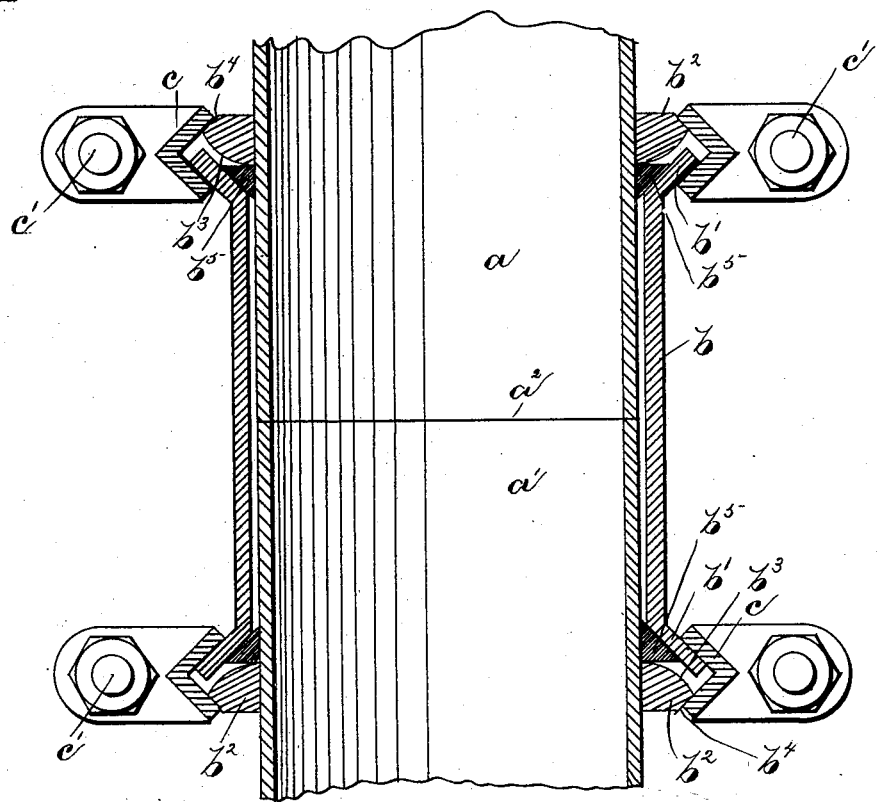
Figure 2:
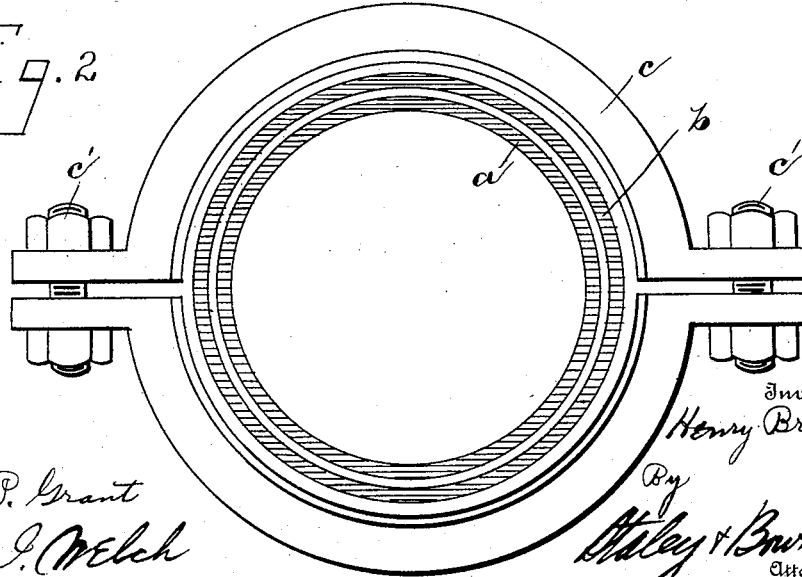

In the accompanying drawings, Figure 1 is a longitudinal sectional view of a structure embodying my invention in one form. Fig. 2 is a transverse sectional view, and Fig. 3 is a detail perspective view, of one of the coupling-ring members.

In the said drawings, $a$ and $a'$ represent two pipes or pipe-sections to be united, their ends being plain or, in other words, not provided with any collars, bells, spigots, or other means for joining said pipes. The ends of said pipes are shown abutting against each other at $a^2$, although this is not essential. The coupling for uniting these pipes comprises a sleeve $b$, loosely surrounding the abutting ends of said pipes, said sleeve being provided at each end with an outwardly-flaring flange $b'$, having outwardly-inclined outer and inner surfaces. The coupling also comprises two compression-rings $b^2$, located one at each end of the sleeve $b$ and fitting loosely on the pipes, so as to be movable longitudinally thereon. These compression-rings are substantially rigid metallic rings, and each of them has its inner side or wall inclined, so as to conform in a general way to the inclination of the opposite face of the flange $b'$ adjacent thereto. This inclination is preferably in the form of a curve, beginning at the extreme inner edge of the ring and extending thence to its outermost portion, as shown at $b^3$. Each ring has a portion of its outer wall or side inclined, as shown at $b^4$, the inclination being the reverse of that of the outer surface of the corresponding flange $b'$. Between each compression-ring $b^2$ and the adjacent end of the sleeve $b$ there is located in the space defined between the pipe the surface $b^3$ of the ring $b^2$ and the inner face of the flange $b'$ a packing-ring $b^5$, preferably of triangular form in cross-section, as shown, and constructed of any suitable compressible material—such, for instance, as rubber. The coupling also comprises two coupling-rings, (indicated by the reference-letter $c$,) each of said rings being composed of two separate halves or sections, each section having a body portion substantially semicircular in form and V-shaped in cross-section, the inner faces converging at an angle corresponding substantially to the angle formed by the outer surface of the flanges $b'$ and the surface $b^4$ of the rings $b^2$. Each half or member of the coupling-rings is provided at each end with an outwardly-extending apertured lug, and the two halves or members of each ring when brought into position are connected on opposites sides of the pipe by screw-bolts $c'$, passing through said lugs and serving to draw the two halves or members bodily toward each other by a direct movement at right angles to the parallel faces of the lugs. Each coupling-ring member is provided on its inner face with two raised ribs or projections extending transversely thereof or in the general direction of the axial line of the pipes to be united, and these ribs are located on opposite sides of the central portion of the ring section or member about half way between the center and ends of the semicircular body portion of said member.

In assembling the coupling the compression-rings $b^2$ and packing-rings $b^5$ are first placed in position on the respective pipes, and the ends of said pipes are then introduced into the sleeve $b$. The packing and compression rings are then brought up against the ends of the sleeve, and the coupling-rings are placed in position at each end of the sleeve and connected by the bolts $c'$. These bolts are then tightened up and will draw the two members of the coupling-ring bodily toward each other, causing the compression-ring $b^2$ to be drawn toward the end of the sleeve, thereby compressing the packing-ring between the inclined surface $b^3$ and the inclined inner surface of the flange $b'$, thus making a tight joint. It will be observed in this connection that the inclined surface $b^3$ begins at the extreme inner portion of the compression-ring where the opposing body of the packing-ring has a maximum thickness, said packing-ring being compressed between surfaces which diverge toward the surface of the pipe against which the packing-ring bears, so that said packing-ring presses with a substantially equal pressure against all three of the surfaces with which it is in contact. In this way an effective sealing of the joint is obtained, and further movement of the compression-ring toward the sleeve will always act to tighten up the joint over all of the contact-surfaces of the packing-ring.

In order to make a tight joint all around the pipe, it is essential that the compression-ring should move equally toward the sleeve at all points of its circumference, and to effect this movement it is essential that the two members of the coupling-ring shall move bodily and equally toward each other. This result is obtained by the provision of means for drawing the two members together at each side of the pipe. The ribs $c^2$ are also of great importance in effecting this uniform movement. This arises from the fact that the inner face of the body of each member of the coupling-ring is semicircular or a segment of a circle and the points of bearing of said members on the ring and sleeve would if these ribs were absent vary according to the distances separating the compression-ring from the sleeve, which distances control the nearest point to which the members of the coupling-ring can approach each other and the pipe. In other words, when the compression-ring is moved out a considerable distance in its initial position each member of the coupling-ring would touch the compression-ring and flange $b'$ only at its extremities adjacent to the lugs On the other hand, if the initial position of the compression-ring is close to the sleeve, then the members of the coupling-ring would touch the compression-ring and flange $b'$ only at their central portions. Where the ribs $c^2$ are employed, the actual contact between the members of the coupling-ring and the inclined surfaces with which they coöperate occurs at four fixed points lying diametrically opposite each other in pairs and distributed equidistantly around the entire ring, so that all binding is avoided, and the coupling-ring is moved uniformly toward the sleeve and against the packing-ring, so as to compress this latter equally all around the pipe, and thus insure a tight joint.

My improved coupling is particularly adapted for use in connection with gas-mains and other underground conduits, and it possesses a material advantage over couplings employing bolts extending longitudinally of the main, in that the mechanism whereby the joint is made tight is complete and self-contained at each end of the coupling, so that it is not necessary to excavate and expose the entire coupling when only one end needs to be tightened up, disconnected, or otherwise operated upon. It possesses advantage over a coupling employing a rotary sleeve encircling the pipe as a means for tightening the joint, in that this latter type requires the pipe to be entirely exposed at the joint to permit rotation of the sleeve, whereas my construction merely requires sufficient excavation to expose the tightening-bolts $c'$. The coupling-ring constructed in two sections with tightening devices on each side of the pipe permits a uniform pressure on the compression-ring and packing, which could not be obtained by a compression-ring made of two similar members hinged at one end and provided with a tightening-bolt at the other, since this latter construction employed with a loose compression-ring would engage said ring only at the side adjacent to the hinge and would either cause binding of the parts or an unequal compression of the packing.

Having thus fully described my invention, what I claim as new, and desire to secure by Letters Patent, is—

A pipe-coupling, comprising a sleeve adapted to receive the ends of the pipes and provided at its extremities with outwardly-flaring flanges having similarly-inclined outer and inner faces, compression-rings loosely mounted on the pipe at each end of the sleeve, their outer sides being inclined reversely to the outer surface of the corresponding flange, and their inner sides being correspondingly inclined to the inner face of the corresponding flange, packing-rings located in the spaces between the pipes, sleeve and compression-rings, and coupling-rings located at each end of the sleeve, each ring being composed of two separate halves or sections, provided at their meeting ends, on opposite sides of the pipe, with tightening-bolts connecting said members to move them uniformly toward each other, said members having V-shaped bearing-faces on their inner face which bear against the external inclines of the corresponding compression-ring and flange, said bearing-faces consisting of transverse ribs located midway between the center and ends of each member, substantially as described.

In testimony whereof I have hereunto set my hand this 30th day of June, A. D. 1903.

HENRY BROOME.

Witnesses:
PERCY NORTON,
CHAS. I. WELCH.